(12) United States Patent
Modaresifar et al.

(10) Patent No.: US 10,677,661 B2
(45) Date of Patent: Jun. 9, 2020

(54) STOP-START METHOD IN A MICROFLUIDIC CALORIMETER

(71) Applicant: Northeastern University, Boston, MA (US)

(72) Inventors: Masoud Modaresifar, Norwood, MA (US); Gregory J. Kowalski, Beverly, MA (US)

(73) Assignee: Northeastern University, Boston, MA (US)

( * ) Notice: Subject to any disclaimer, the term of this patent is extended or adjusted under 35 U.S.C. 154(b) by 234 days.

(21) Appl. No.: 15/805,650

(22) Filed: Nov. 7, 2017

(65) Prior Publication Data

US 2018/0128693 A1 May 10, 2018

Related U.S. Application Data

(60) Provisional application No. 62/419,531, filed on Nov. 9, 2016.

(51) Int. Cl.
*G01K 17/00* (2006.01)
*G01K 1/00* (2006.01)
(Continued)

(52) U.S. Cl.
CPC .............. *G01K 11/32* (2013.01); *B01L 3/502* (2013.01); *G01K 17/006* (2013.01); *G01N 25/4873* (2013.01)

(58) Field of Classification Search
USPC .................................. 374/31, 100, 208, 141
See application file for complete search history.

(56) References Cited

U.S. PATENT DOCUMENTS 7,762,719 B2 * 7/2010 Fon ...................... G01K 17/006
374/208
8,076,151 B2 12/2011 Larson et al.
(Continued)

FOREIGN PATENT DOCUMENTS

WO  WO 2008/08829 A2  7/2008

OTHER PUBLICATIONS

European Search Report for Int'l Appl. No. EP 17 20 0452, entitled "Stop-Start Method in a Microfluidic Calorimeter," consisting of 7 pages, dated Mar. 13, 2018.

*Primary Examiner* — Mirellys Jagan
(74) *Attorney, Agent, or Firm* — Hamilton, Brook, Smith & Reynolds, P.C.

(57) ABSTRACT

A method for calorimetry includes flowing a first fluid through a co-flow reactor microchannel having plural inlets and an outlet, the first fluid flowing through each of the inlets, and measuring transmission of light through a Nano Hole Array (NHA) sensor to obtain a baseline extraordinary optical transmission (EOT) measurement. The flow of the first fluid is stopped, the microchannel is emptied of the first fluid, and the first fluid and a second fluid are passed through the microchannel such that a reaction occurs, the first fluid flowing through a first of the inlets and the second fluid flowing through a second of the inlets. While flowing the first and second fluids, transmission of light through the NHA sensor is measured to obtain a reaction EOT measurement. A calorimetry measurement, indicative of energy released during the reaction, is calculated as a function of the baseline and reaction EOT measurements.

18 Claims, 8 Drawing Sheets

(51) Int. Cl.
*G01K 13/00* (2006.01)
*G01K 11/32* (2006.01)
*B01L 3/00* (2006.01)
*G01N 25/48* (2006.01)

(56) References Cited

U.S. PATENT DOCUMENTS

| | | | |
|---|---|---|---|
| 8,900,021 B2 | 12/2014 | Sulek et al. | |
| 9,377,422 B2 | 6/2016 | Ficring et al. | |
| 2012/0264224 A1* | 10/2012 | Fiering | B82Y 15/00 436/147 |
| 2014/0160483 A1 | 6/2014 | Trainoff | |
| 2014/0248621 A1* | 9/2014 | Collins | G01N 15/1031 435/6.12 |
| 2015/0278588 A1 | 10/2015 | Marshall et al. | |

* cited by examiner

STOP-START METHOD IN A MICROFLUIDIC CALORIMETER

RELATED APPLICATION

This application claims the benefit of U.S. Provisional Application No. 62/419,531, filed on Nov. 9, 2016.
The entire teachings of the above application are incorporated herein by reference.

BACKGROUND calorimetry is a particularly advantageous method used to study the thermodynamics of binding interactions (e.g., protein-protein interactions, proteins-DNA, drug-protein interactions) of biological and/or pharmaceutical compounds. Calorimetry measures the energy released or absorbed by a reaction over a range of reactant concentrations, and uses this information to determine the thermodynamic properties, stoichiometry, and equilibrium binding constant for the reaction.

Temperature sensors conventionally employed for determining the heat of a chemical reaction in calorimetry studies include thermocouples, thermopiles, and/or thermistors. Other temperature sensing methods include sensors with microfluidic channels and have used changes in optical properties to infer temperature changes in reactions. However, these optical-based temperature-sensing approaches often lack a desired sensitivity for detecting small changes in temperature. In addition, the occurrence of air bubbles in microfluidic channels can have a deleterious effect on optical-based approaches.

SUMMARY

A method for calorimetry includes flowing a first fluid through a co-flow reactor microchannel having plural inlets and an outlet, the first fluid flowing through each of the inlets. While flowing the first fluid, transmission of light is measured through a Nano Hole Array (NHA) sensor to obtain a baseline extraordinary optical transmission (EOT) measurement. The method includes stopping flow of the first fluid and then emptying the co-flow reactor microchannel of the first fluid. The method further includes flowing the first fluid and a second fluid through the co-flow reactor microchannel such that a reaction occurs at least at a diffusion interface of the fluids, the first fluid flowing through a first of the inlets and the second fluid flowing through a second of the inlets. While flowing the first and second fluids, transmission of light through the NHA sensor is measured to obtain a reaction EOT measurement. A calorimetry measurement is calculated as a function of the baseline EOT measurement and the reaction EOT measurement. The calorimetry measurement is indicative of energy released during the reaction.

Flowing the first and seconds fluids can include using a syringe pump to drive the first fluid from a first syringe coupled to the first of the inlets and drive the second fluid from a second syringe coupled the second of the inlets.

Flowing the first fluid can include flowing the first fluid at a selected volumetric flow rate through each of the inlets. Flowing the first and second fluids can include flowing the first and second fluids through first and second inlets, respectively, at the same selected volumetric flow rate.

Emptying the co-flow reactor microchannel can include applying a vacuum source to the microchannel.

Measuring transmission of light can include irradiating the NHA sensor and fluid flowing through the co-flow reactor microchannel with incident light.

In embodiment, the NHA sensor includes an array of holes in an electrically conducting layer, the layer being proximate to and in thermal contact with the co-flow reactor microchannel. The first and second fluids can comprise dielectric materials.

In an embodiment, the second fluid included a carrier fluid and a reactant. The first fluid can include a carrier fluid and a reactant that is different from the reactant of the second fluid. The carrier fluids of the first and second fluids can be the same.

Calculating the calorimetric measurement can include averaging the EOT measurements over a period of time to obtain an averaged baseline EOT value and an averaged reaction EOT value. Calculating the calorimetric measurement can include calculating an EOT difference by subtracting the averaged reaction EOT value from the averaged baseline EOT value.

In an embodiment, the EOT difference is calculated for multiple NHA sensors that are equally spaced apart. The NHA sensors can be arranged in parallel rows. The rows can be transverse to a direction of flow through the co-flow reactor microchannel.

Stopping the flow of the first fluid and emptying the co-flow reactor microchannel can reduce formation of bubbles when, subsequently, flowing the first and second fluids through the co-flow reactor microchannel.

A system for calorimetry includes a co-flow reactor microchannel having plural inlets and an outlet, a Nano Hole Array (NHA) sensor coupled to the co-flow reactor microchannel, a pump to drive fluid through the co-flow reactor microchannel; a vacuum source coupled to the microchannel; and a controller coupled to the pump and the NHA sensor. The controller is programmed to: control the pump to flow a first fluid through a co-flow reactor microchannel, the first fluid flowing through each of the inlets; while flowing the first fluid, measure transmission of light through the NHA sensor to obtain a baseline extraordinary optical transmission (EOT) measurement; control the pump to stop the flow of the first fluid; control the vacuum source to empty the co-flow reactor microchannel of the first fluid after stopping the flow of the first fluid; control the pump to flow the first fluid and a second fluid through the co-flow reactor microchannel such that a reaction occurs at least at a diffusion interface of the fluids, the first fluid flowing through a first of the inlets and the second fluid flowing through a second of the inlets; while flowing the first and second fluids, measure transmission of light through the NHA sensor to obtain a reaction EOT measurement; and calculate a calorimetry measurement as function of the baseline EOT measurement and the reaction EOT measurement, the calorimetry measurement being indicative of energy released during the reaction.

The pump can be a syringe pump configured to drive the first fluid from a first syringe coupled to the first of the inlets and, when flowing the first and second fluids, drive the second fluid from a second syringe coupled the second of the inlets. In certain embodiments, two or more syringe pumps are used to drive fluid into the inlets and through the microchannel. A syringe pump may also be used to evacuate fluid from the microchannel, to empty the microchannel and any fluid lines that are coupled to the microchannel.

The system can further include a light source configured to irradiate the NHA sensor and fluid flowing through the co-flow reactor microchannel. The controller can be programmed to control the light source to irradiate the NHA sensor and fluid flowing through the co-flow reactor microchannel with incident light to measure the transmission of light.

The system can include multiple NHA sensors that are equally spaced apart, in which case the EOT difference can be calculated for the multiple NHA sensors. In an embodiment, the NHA sensors are arranged in parallel rows that are transverse to a direction of flow through the co-flow reactor microchannel. Each NHA sensor can include an array of holes in an electrically conducting layer, the layer being proximate to and in thermal contact with the co-flow reactor microchannel.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

FIGS. 2A-2B are top views of a co-flow reactor microchannel illustrating a reaction zone and Nanohole Array (NHA) sensors according to an example embodiment of the invention.

DETAILED DESCRIPTION

A description of example embodiments follows.

Described are a method, including a Stop-Start process, and associated system to eliminate the effect of air bubbles in micro-channels utilizing continuous flow. The method and system are particularly useful for calorimetry. In a continuous flow micro-channel, two or more fluids (e.g., different fluids) enter from separate inlets and mix together. Introducing a new fluid in microfluidics is usually accompanied by air bubbles. Accumulation and formation of air bubbles is a problem in microfluidics devices. The bubbles can be disruptive to the samples flowing into microfluidic channels and can change the microenvironment.

In a calorimetry device that uses a co-flow reactor microchannel, air bubbles block the light going through the micro-channel and change the light transmission intensity, thus affecting a useful characteristic of technology. Using the proposed stop-start method, the disruptive effect of these air bubbles is eliminated and repeatable results are achieved. This is a significant improvement to microfluidic device and microfluidic experiments.

Methods and systems according to example embodiments of the invention described herein include one or more the following useful features and provide several advantages over prior approaches. Embodiments can remove the air bubbles during the measurement phase of the experiment in a microfluidic channel, decrease the time of experiments as there is no need to wait for removal or trapping the bubbles, and the time of bubble-free system as reported in literature is no longer an issue, an provide repeatable calorimetry data, in particular EOT data, which is a useful feature of using the stop-start method. The method is simple and can be implemented using the existing continuous flow micro-channels.

Unlike other approaches, the method presented herein does not need additional devices to be deployed in order to remove or trap the air bubbles. Furthermore, no additional fluid is needed in order for the air bubbles to be removed from the channels. In particular, the effect of the injected dead volume, which is considered to be a major cause of air bubbles, is not a concern in this new method.

Examples of commercial applications of embodiments of the present invention include microfluidics measurement systems, such as for chemical processes and drug discovery. The small size, lower compound (e.g., reactant) use, and fast response time make the method described herein useful for high-throughput screening applications.

Ultra-sensitive temperature sensing and calorimetry utilizes a sensing technology that involves nanohole array (NHA) sensors, a light source, and a CCD camera for detecting the light intensity through the nanoholes. The intensity of light through these nanoholes is called EOT (Extraordinary Optical Transmission). The EOT is a function of temperature, pressure, and concentration and is the basis for the ultra-sensitive calorimetry.

Devices and methods for ultra-sensitive temperature sensing and calorimetry have been described by Larson and Kowalski in International Patent Application Publication WO2008/088829, published Jul. 24, 2008, and corresponding U.S. Pat. No. 8,076,151 to Larson and Kowalski, issued Dec. 13, 2011, the teachings of which are incorporated herein by reference in their entirety.

A system and method for a microfluidic calorimeter have been described in U.S. Pat. No. 9,377,422 to Fiering et al., issued Jun. 28, 2016, the teachings of which are incorporated herein by reference in their entirety.

The Stop-Start method according to embodiments of the present invention can be used in a continuous flow in microfluidics channels, in particular for ultra-sensitive temperature sensing and calorimetry. In the present and former methods, the continuous data acquisition cannot happen when air bubbles are present in either flow (inlet) channel.

Steady state data acquisition of calorimetric thermodynamic data is the basis of the continuous, co-flow microchannel device. The diffusion of one fluid, fluid A, or compound into another compound, fluid B, produces a reaction, which is observed to measure the desired thermodynamic information in these devices. The problem is that air bubbles tend to be present when the fluids are injected into the channels. These air bubbles affect flow character and molecules. The bubbles prevent property measurements at the moment of injection. One can wait a sufficient time for the air bubbles to flow through the channel or remove them by increasing the volumetric flow rate.

Figure 1A:
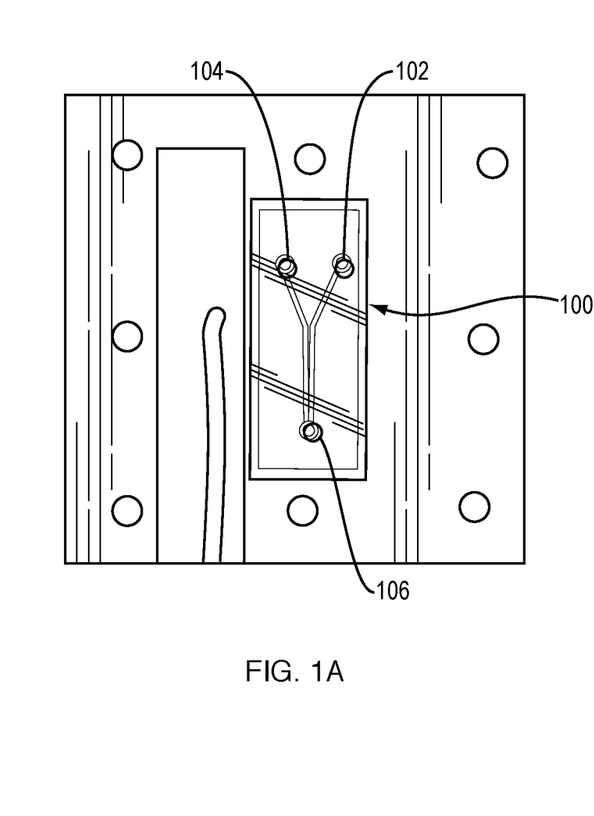
FIG. 1A is a top view of an example co-flow reactor microchannel illustrating two inlets and an outlet.
Figure 1B:
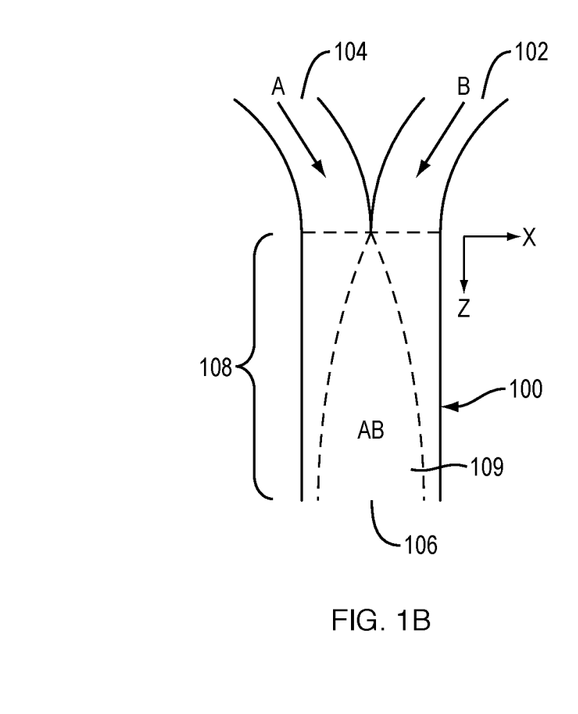
FIG. 1B is a schematic illustration of flowing fluids A and B through the co-flow reactor microchannel.

In a typical continuous co-flow microchannel 100, there are two inlets 102, 104 and one outlet 106, as illustrated in FIG. 1A. Two fluids (A, B) enter the channels via inlets 102, 104 and flow through microchannel 100. The fluids interact in reaction zone 108, e.g., by diffusion, chemical reaction, etc. The interaction of fluids A and B is illustrated in FIG. 1B as a plume shaped region 109. The fluids can be injection into inlets 102 and 104 using a syringe pump (see FIG. 8).

In an embodiment, two syringes are mounted on the pump, and the volumetric flow rate of the entering fluids is controlled by the pump. The co-flow microchannel 100 is used to investigate an effect of two different fluids or compounds on each other and to extract thermodynamic properties of the two compounds. In order to study these effects, both properties of the two compounds and pure compound are needed. Pure compound is when the same fluid (e.g., fluid A) is in two syringes, and Reaction compound is when two different fluids (e.g., fluids A, B) are in two syringes. For example, one of the two syringes containing fluid A may be swapped out for a syringe containing fluid B.

In prior approaches, such as described in U.S. Pat. No. 9,377,422, an injector is utilized in the transition from pure compound to reaction compound. The injector is a device that is placed in the path of flow from the syringes to the co-flow channel. The injector device has a small volume containing a fluid of interest (e.g., a carrier fluid and a reactant), which is injected into the main flow path when activated. When the injector is off, the flow goes through the main path inside the injector and continues toward the channel. Most of the time, this process results in air bubbles going into the main path. The air bubbles are usually trapped in the small volume of the injector, and, upon activating the injector, the air bubbles go into the main path and the channels.

Air bubbles in the microchannel(s) block the light going through the sensors and affect the observed EOT. Even very small bubbles passing into the channels can destroy data acquisition. Therefore, it is preferred that data acquisition, e.g., measurement of light transmission, occurs when there are no bubbles in the channel.

Figure 2A:
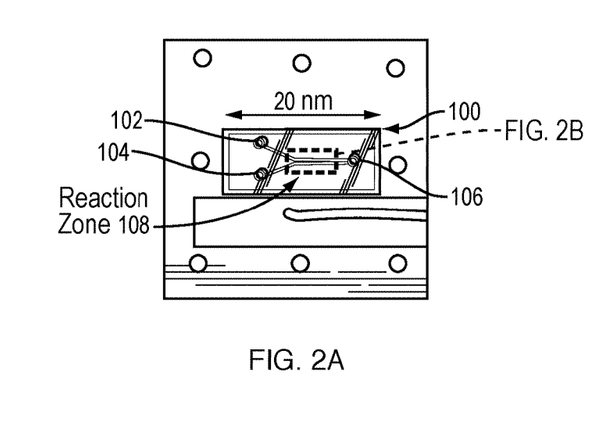
Figure 2B:
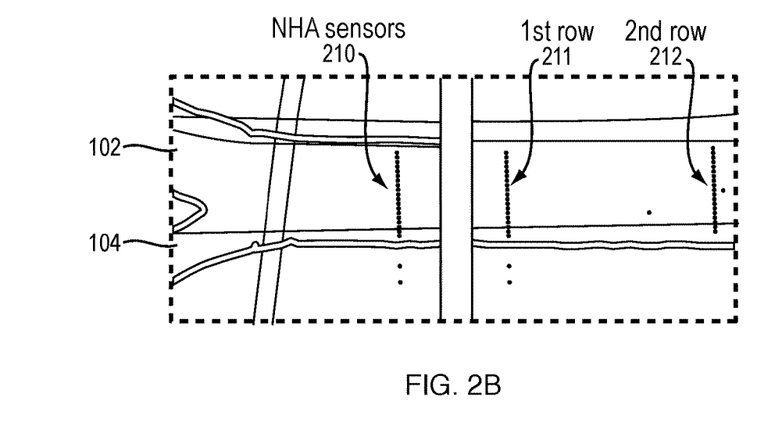
FIG. 2B shows two CCD camera views of the reaction zone of the microchannel of FIG. 2A illustrating the arrangement of the NHA sensors.

FIGS. 2A-2B are top views of co-flow reactor microchannel 100 illustrating two inlets 102, 104 and an outlet 106 (FIG. 1A), a reaction zone 108, and Nanohole Array (NHA) sensors 210. The co-flow reactor microchannel 100 is configured such that a reaction of fluids flowing through the microchannel can occur in the reaction zone, where it can be monitored by the NHA sensors 210.

FIG. 2B shows CCD camera, over exposed views of the microchannel 100 and the NHA sensors 210. Each of the bright spots on the CCD view is one NHA sensor 210, which includes an array of small apertures. In an embodiment, the sensor 210 includes a 10×10 array of apertures with a diameter of 150 nm and pitch size of 350 nm. These small holes can be made by using Focused Ion Beam or lithographic type processes on a 100 nm gold layer on a glass substrate. Suitable NHA sensor configurations and dimensions are described, for example, in U.S. Pat. Nos. 8,076,151 and 9,377,422.

The two fluids (e.g., compounds) entering the channel 100 from the two channel inlets 102, 104 (left view of FIG. 2B) and mix and react along the channel in a region that is called the reaction zone 108. Two rows 211, 212 of sensors 210, which in this embodiment include 19 sensors in each row, align across the flow and cover the channel width in two different locations, as illustrated in FIG. 2B (right view).

When the two fluids (e.g., compounds) are mixed in the reaction zone 108, the portion of the sensors 210 that are in the reaction plume 109 (FIG. 1B) experience a change in the light transmission intensity. This intensity is called Extraordinary Optical Transmission (EOT). The other sensors, which are positioned outside of the plume 109, have the same intensity. When there is a temperature change, the intensity through the NHA changes. This is the basis for the plot in FIG. 3, which shows ΔEOT vs. sensor #.

Figure 3:
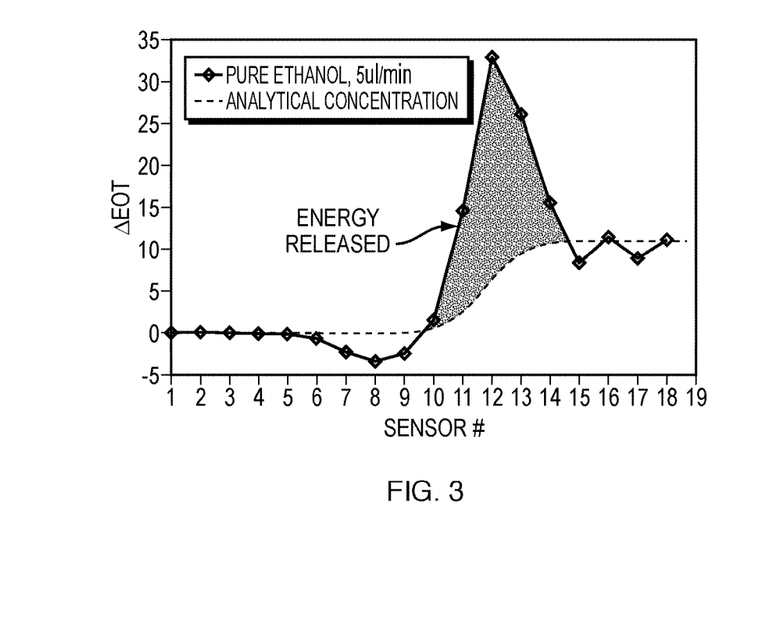
FIG. 3 is a graph illustrating change in extraordinary optical transmission ($\Delta EOT$) for a row of sensors across the microchannel width according to an example embodiment of the invention. The triangular area is related to energy released during a reaction.

FIG. 3 shows the change in the EOT intensity in a microfluidic flowcell (e.g., a co-flow microchannel with NHA sensors) with respect to the channel width using the Stop-Start method. When there is no reaction, no temperature changes take place and the intensity follows the dashed line. The dashed line represents the analytical concentration change for the two compounds. In this plot, the two compounds are water and 100% concentration of ethanol. The triangular region is the difference between the temperature affected intensity and the concentration only affected intensity. The temperature effect is related to steady-state energy released and the enthalpy of dilution of the two compounds, here water and ethanol.

Figure 4:
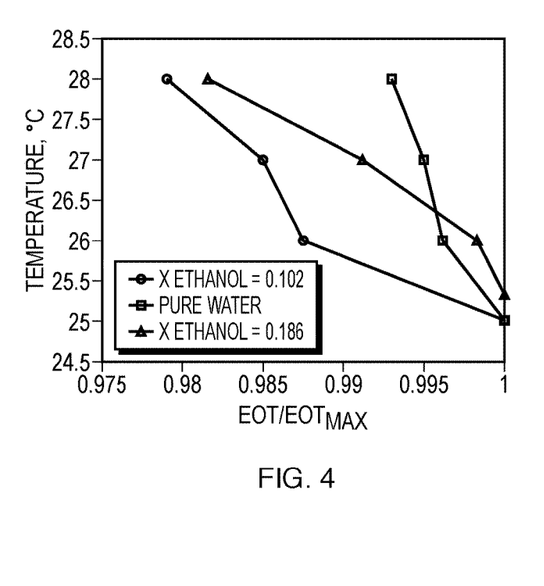
FIG. 4 is a calibration plot for an example sensor illustrating normalized EOT vs. temperature at three different concentrations of ethanol in water.

The temperature and concentration are measured with the EOT and are related through calibration curves as, for example, described in U.S. Pat. No. 8,076,151 to Larson and Kowalski (see their FIG. 8 and associated description). FIG. 4 shows a typical calibration plot, where $X_{ethanol}$ is the mole fraction of ethanol in mixture. The calibration plot is constructed by injecting known fluids in the microchannel and changing the temperature in stepped intervals using a thermal control device (see, e.g., control device 832 in FIG. 8). The observed ΔEOT is plotted as a function of the set temperatures in order to derive the relationship between ΔEOT and the temperature of the dielectric medium. This is the relationship that can be used to extract the thermodynamic properties from the experiment. The calibration procedure can be tailored to a particular experiment by changing the composition of the fluid used in the calibration to correspond to that expected during the experiment. The ΔEOT for each composition at each temperature is then used to construct a calibration plot.

A method of extracting and calculating the ΔEOT is further described below with reference to FIG. 7.

Figure 5:
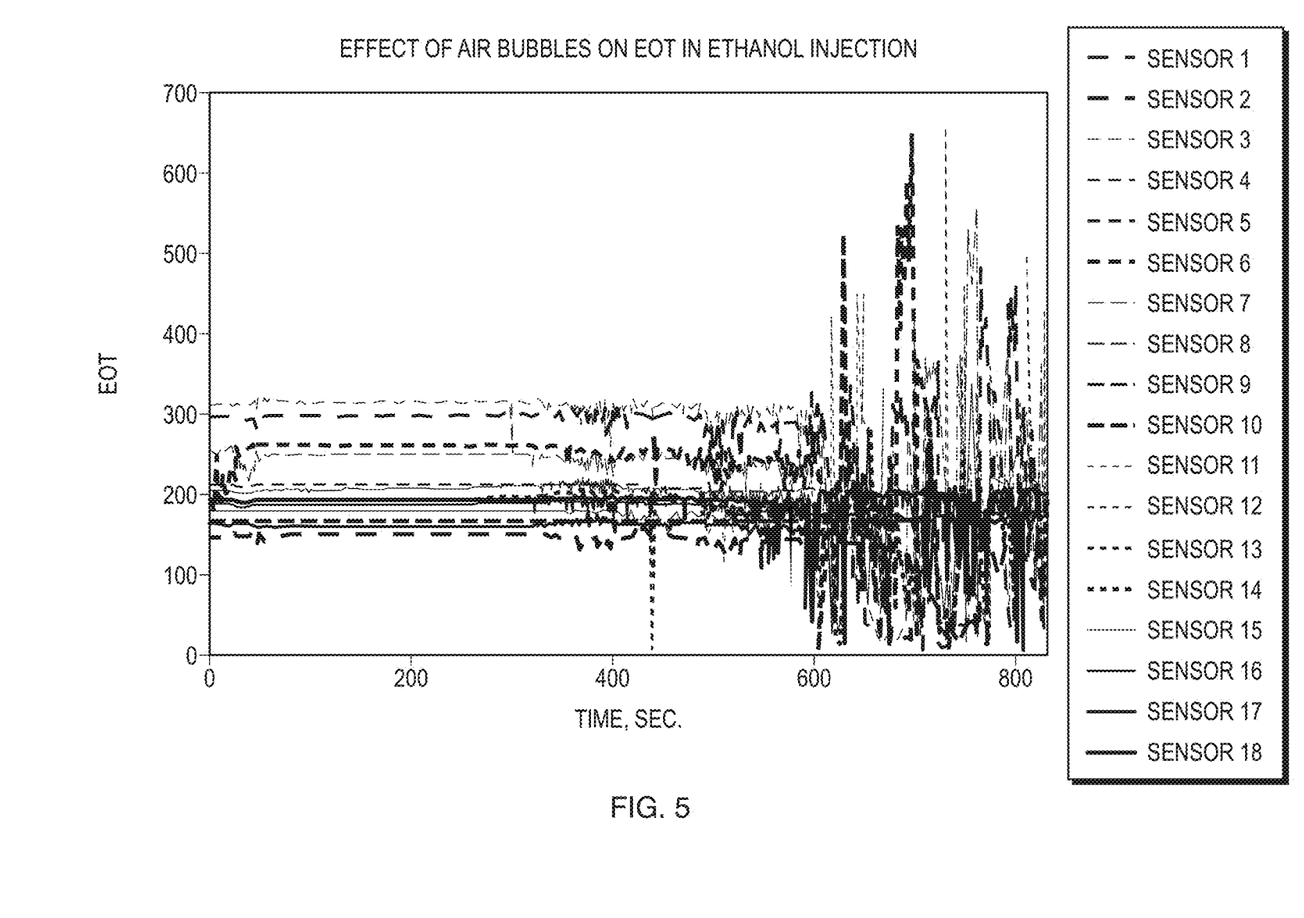
FIG. 5 illustrates the effect of air bubbles on EOT measurements.

FIG. 5 illustrates the effect of bubbles introduced by using an injector. In the figure, the effect of air bubbles on the intensity measurement (EOT) can be observed. At the outset, water is flowing through the microchannel. At 350 seconds, ethanol is injected to the water. Air bubbles start to form and spread to the channel. As air bubbles move over the NHA sensors, the light is obstructed and the EOT is affected, as can be seen in the sensor measurements shown in FIG. 5, for example, at around 600 seconds and onwards. The magnitude of the noise level is very high in such a way that the intensity (EOT) data cannot be interpreted. In this figure, the EOT intensity for the sensors in a first row (e.g., row 211, FIG. 2B) is presented. The same trend is observed in a second row of sensors (e.g., row 212, FIG. 2B). The result of using this bubbled noised data on the ΔEOT vs. sensor # plot is shown in FIG. 6A.

Figure 6A:
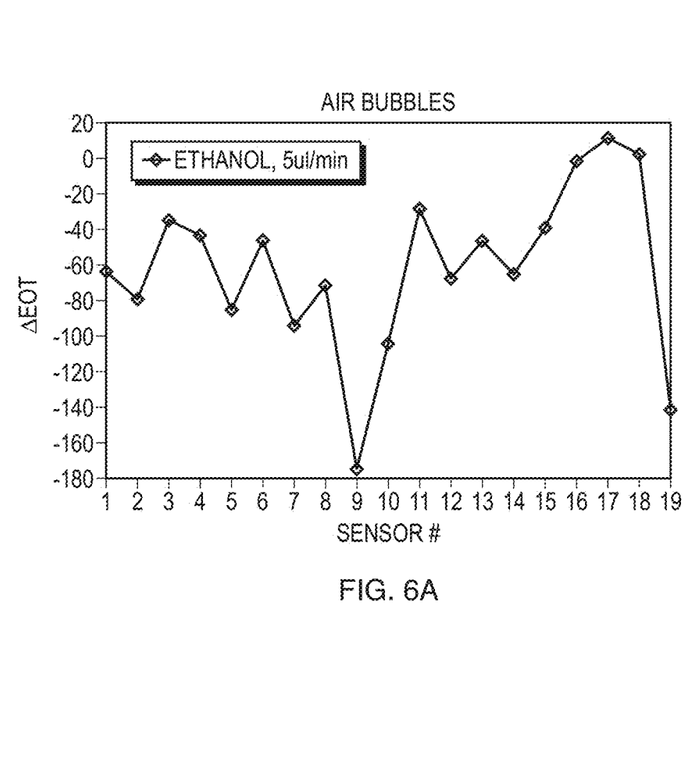
FIG. 6A-6B further illustrate the effect of air bubbles on $\Delta EOT$ measurements.
Figure 6B:
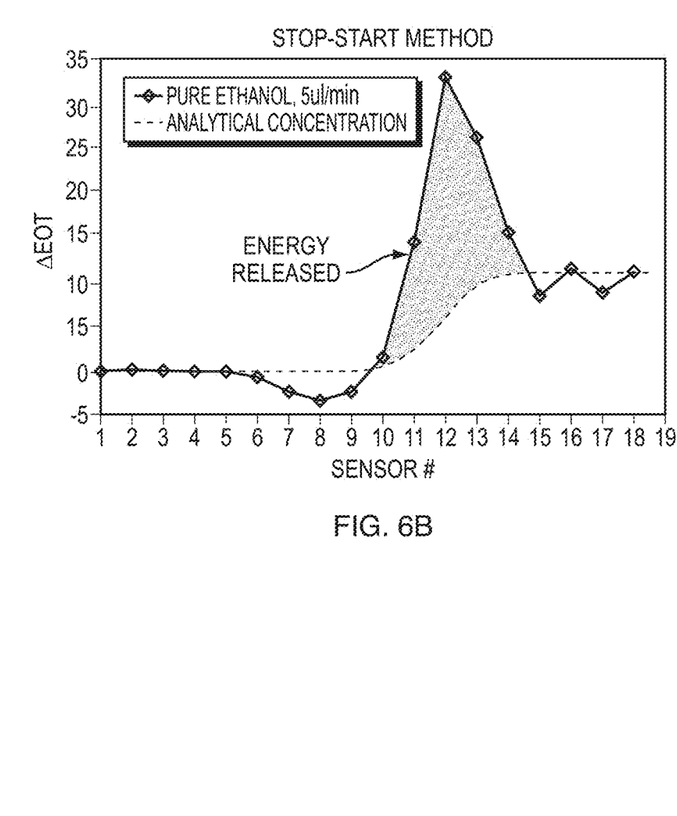

FIG. 6A illustrates results that are obtained when the same data reduction process that is used for the Stop-Start method case is used in the air bubble case. For ease of comparison, FIG. 6B show the ΔEOT vs. sensor # plot for the Start-Stop method as previously presented in FIG. 3. There is no clear triangular region in ΔEOT vs. sensor # plot in FIG. 6A. In contrast, FIG. 6B shows the triangular region (area under the curve), which is a result of energy released that can be identified in Stop-Start experiment method. With air bubbles present (FIG. 6A), no definitive results can be extracted from the ΔEOT vs. sensor # plot.

As described above and illustrated in FIGS. 5 and 6A, using a continuous injection and data acquisition method causes air bubbles and no definitive results with regard to EOT intensity data. To overcome this problem, continuous EOT intensity data acquisition during an injection test is replaced with a sequence of actions in the Stop-Start method of the present invention.

Figure 7:
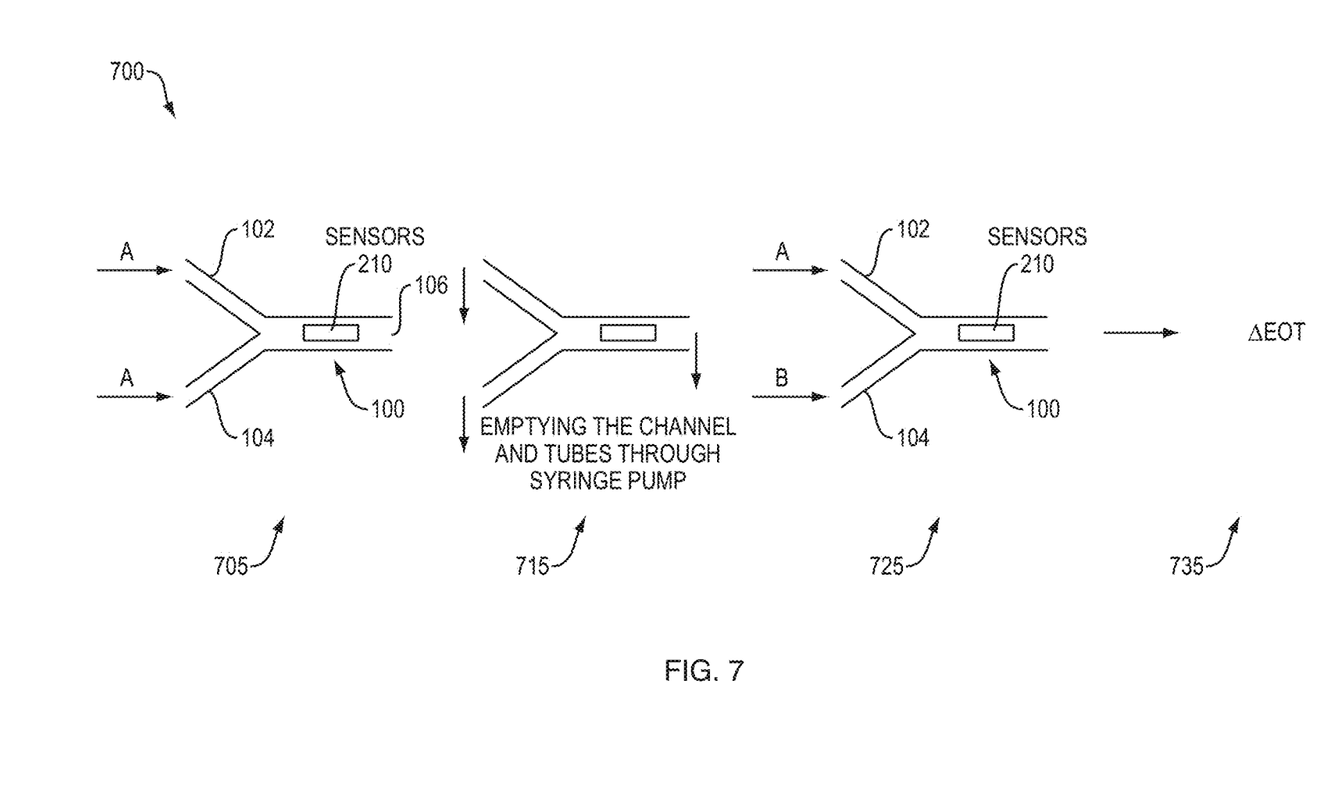
FIG. 7 is a schematic illustration of a method for calorimetry employing data acquisition using the stop-start process according to an example embodiment.

FIG. 7 is a schematic illustration of a method 700 for calorimetry employing data acquisition using the stop-start process according to an example embodiment. The method 700 is described using the example of two fluids, A and B, and co-flow through a microchannel 100 having two inlets 102, 104 and an outlet 106. First (705), one fluid A (e.g., a compound, a carrier fluid including a reactant) is injected through both inlets 102, 104 into the channel 100 with suitable injection means, e.g., a syringe pump. The EOT intensity is collected using sensor 210 at desired experiment parameters such as temperature and flowrate. Second (715), the channel 100 is emptied of fluid with a pump or other vacuum source. Third (725), the two fluids A, B (e.g., two compounds, two carrier fluids including reactants, etc.) are injected into the inlet channels 102, 104 and microchannel 100. The EOT intensity is collected using sensor 210 at steady state with the same parameters as in the first step (715). The two sets of data are compared to get the proper ΔEOT vs. sensor # plot, as illustrated in FIGS. 3 and 6B.

FIG. 7 provides a method for calorimetry includes flowing a first fluid through a co-flow reactor microchannel 100 having plural inlets and an outlet, the first fluid flowing through each of the inlets. While flowing the first fluid, transmission of light is measured through a Nano Hole Array (NHA) sensor 210 to obtain a baseline extraordinary optical transmission (EOT) measurement. The method includes stopping flow of the first fluid and then emptying the co-flow reactor microchannel of the first fluid. The method further includes flowing the first fluid and a second fluid through the co-flow reactor microchannel such that a reaction occurs at least at a diffusion interface of the fluids, the first fluid flowing through a first of the inlets and the second fluid flowing through a second of the inlets. While flowing the first and second fluids, transmission of light through the NHA sensor is measured to obtain a reaction EOT measurement. A calorimetry measurement (e.g., ΔEOT, area under the curve of a ΔEOT plot) is calculated as a function of the baseline EOT measurement and the reaction EOT measurement. The calorimetry measurement is indicative of energy released during the reaction.

The proposed method eliminates the effect of air bubbles by separating Pure compound data acquisition (when flowing a first fluid, A) from the Reaction compound data acquisition (when flowing the first fluid, A, and a second fluid, B). In an embodiment, assuming that there are two different fluids A and B, two syringes are filled with fluid A and another syringe contains fluid B. The two syringes containing fluid A are driven by a syringe pump. The pump starts at a particular volumetric flow rate, and fluids enter the microchannel. There may be some bubbles at the beginning, but one can wait until they pass through the channel and then record EOT data at each Nanohole Array sensor with a light sensor, e.g., a CCD camera. At this point, a switch is used to change the flow from one of the syringes containing fluid A to the syringe containing fluid B, which may be driven by a parallel syringe pump. The parallel pump is running with the same volumetric flow rate, and all other properties of the experiment are kept the same. After initial air bubbles (because of switching syringes) are gone, the data (EOT) is recorded. In order to compare the two sets of data, the recorded EOTs are averaged over a certain period of time. The averaged EOT of the Reaction compound (fluids A and B) are subtracted from that of the pure compound (fluid A). The EOT difference results are related to the reaction effects (see, e.g., FIG. 3).

Figure 8:
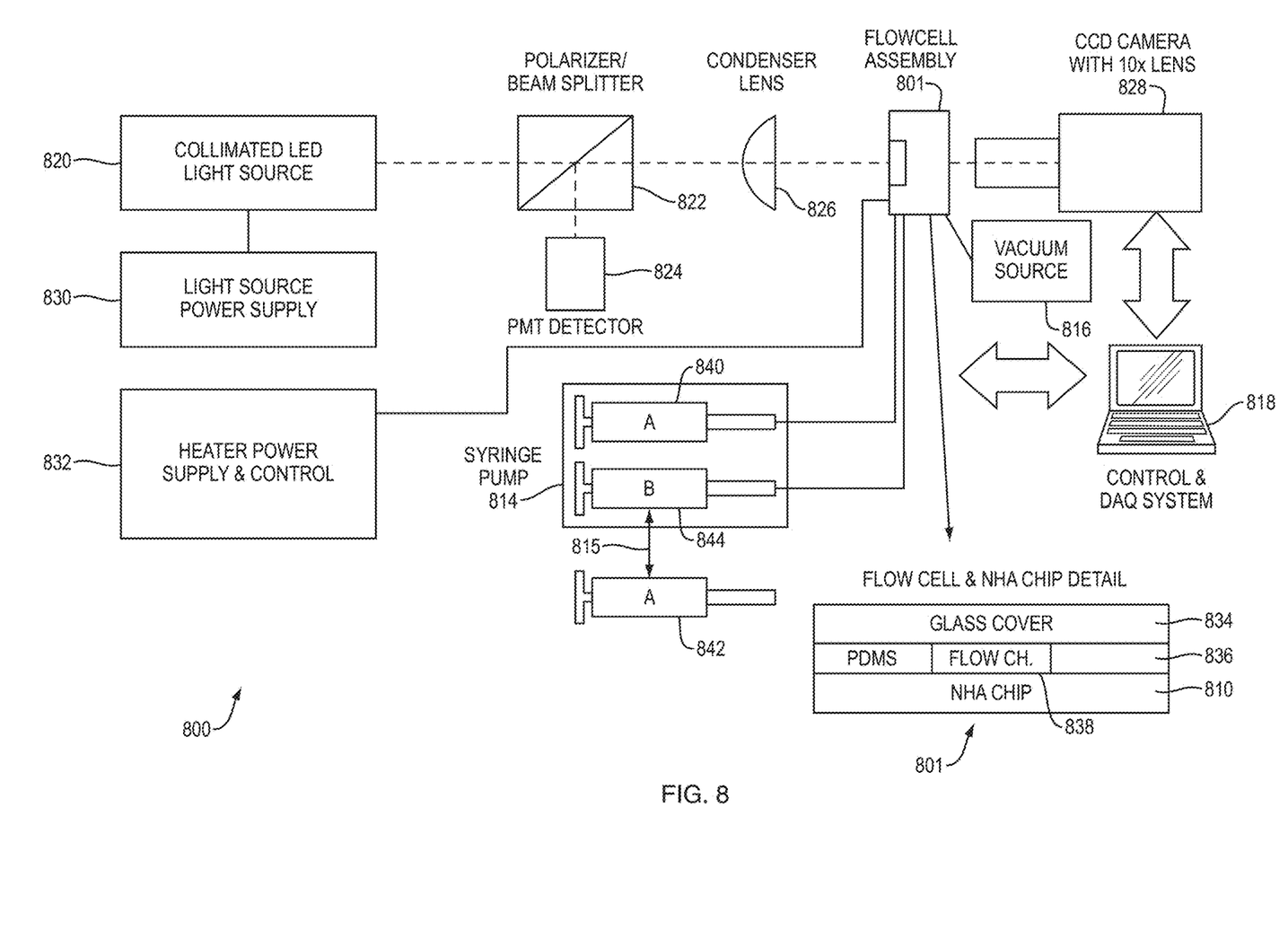
FIG. 8 is a schematic diagram of a system for calorimetry according to an example embodiment.

FIG. 8 is a schematic diagram of a system 800 for calorimetry according to an example embodiment. The system includes a flowcell assembly 801 that includes a co-flow reactor microchannel 838 and a Nano Hole Array (NHA) sensor chip 810 coupled to the co-flow reactor microchannel. A pump 814 is configured to drive fluid through the co-flow reactor microchannel of the flowcell assembly 801. The system further includes a vacuum source 816 coupled to the microchannel of the flowcell assembly 801. A controller 818, shown as control and data acquisition (DAQ) system, is coupled to various system components, including the pump 814 and a CCD camera 828. In combination with the NHA sensor chip 810 and a light source 820, the camera 828 allows detection of EOT through flowcell 801.

As shown in FIG. 8, the flowcell assembly 801, which includes the co-flow microchannel 838, has two inlets and an outlet. The pump 814 is a syringe pump configured to drive a first fluid (A) from a first syringe 840 that is coupled to a first of the inlets. A second syringe 844, which includes a second fluid (B), is coupled the second of the inlets. When flowing the first and second fluids through the flowcell assembly 801, the pump 814 drives the second fluid (B) from the second syringe 844. A third syringe 842, which also includes fluid A, is initially used to flow fluid A through the second inlet while also flowing fluid A from syringe 840 through the first inlet, for baselines EOT measurements. After baseline EOT measurements are completed, flow of fluid A is stopped (by stopping pump 814) and the flow channel is emptied of the first fluid using vacuum source 816. In the example system configuration shown, the vacuum source 816 is coupled to the outlet of the flowcell assembly 801. The vacuum source can be a syringe pump. Once the channel is emptied, the system switches (815) between syringes 842 and 844. This may be accomplished via an actuator, e.g., a robotic drive, under the control of controller 818. Alternatively, the controller 818 may signal a user to perform the switch. The user can then manually swap the syringes positioned in the syringe pump 814.

Suitable syringe pumps that can be used in embodiments of the invention include, for example, the PHD™ and PHD ULTRA™ syringe pumps (Harvard Apparatus, Holliston, Mass.).

The system 800 includes a light source 820 configured to irradiate the NHA sensor 810 and fluid flowing through the co-flow reactor microchannel 838 of the flowcell assembly 801. As illustrated in FIG. 8, the light source 820 is a collimated LED light source powered by power supply 830. The controller 818 can be programmed to control the light source 820 to irradiate the NHA sensor and fluid flowing through the flowcell assembly 801 with incident light to measure the transmission of light. The illumination emanating from the light source 820 is sent through a polarizer/beam splitter 822, which sends part of the incident beam to a photomultiplier tube (PMT) detector 824 to monitor the intensity of the beam. The other part of the light beam is directed through condenser lens 826 onto the flowcell assembly 801. A CCD camera 828, which includes a 10× magnification lens, captures light transmitted through the flowcell assembly 801. Any significant absorption in the sample fluid(s) can be determined by comparing the light intensity measured with the PMT detector 824 and the light intensity detected with the CCD camera 828.

As shown in FIG. 8, the NHA chip 810 of the flowcell 801 includes multiple NHA sensors. Each NHA sensor can include an array of holes in an electrically conducting layer that are proximate to and in thermal contact with the co-flow reactor microchannel 838. The microchannel 838 can be manufactured from polydimethylsiloxane (PDMS), a silicon-based organic polymer. The rheological (flow) properties of PDMS make it particular suitable for microfluidics applications. A glass cover 834 is used to cover and protect the micro channel. The system includes a heater power supply and control 832 to monitor and control temperature of the flowcell assembly 801 during EOT measurements. In a typical arrangement of sensors on the NHA chip 810, the sensors are equally spaced apart. The NHA sensors can be arranged in parallel rows that are transverse to a direction of flow through the co-flow reactor microchannel, as illustrated in FIG. 2B. The EOT difference can be calculated for multiple NHA sensors and multiple rows of sensors, as illustrated in FIGS. 10A-10F.

The controller 818 of system 800 can be programmed to: control the pump 814 to flow a first fluid through a co-flow reactor microchannel 838, the first fluid flowing through each of the inlets; while flowing the first fluid, measure transmission of light through the NHA sensor 810 to obtain a baseline extraordinary optical transmission (EOT) measurement; control the pump 814 to stop the flow of the first fluid; control the vacuum source 816 to empty the co-flow reactor microchannel of the first fluid after stopping the flow of the first fluid; control the pump 814 to flow the first fluid and a second fluid through the co-flow reactor microchannel such that a reaction occurs at least at a diffusion interface of the fluids, the first fluid flowing through a first of the inlets and the second fluid flowing through a second of the inlets; while flowing the first and second fluids, measure transmission of light through the NHA sensor 810 to obtain a reaction EOT measurement; and calculate a calorimetry measurement as function of the baseline EOT measurement and the reaction EOT measurement, the calorimetry measurement being indicative of energy released during the reaction.

Figure 9:
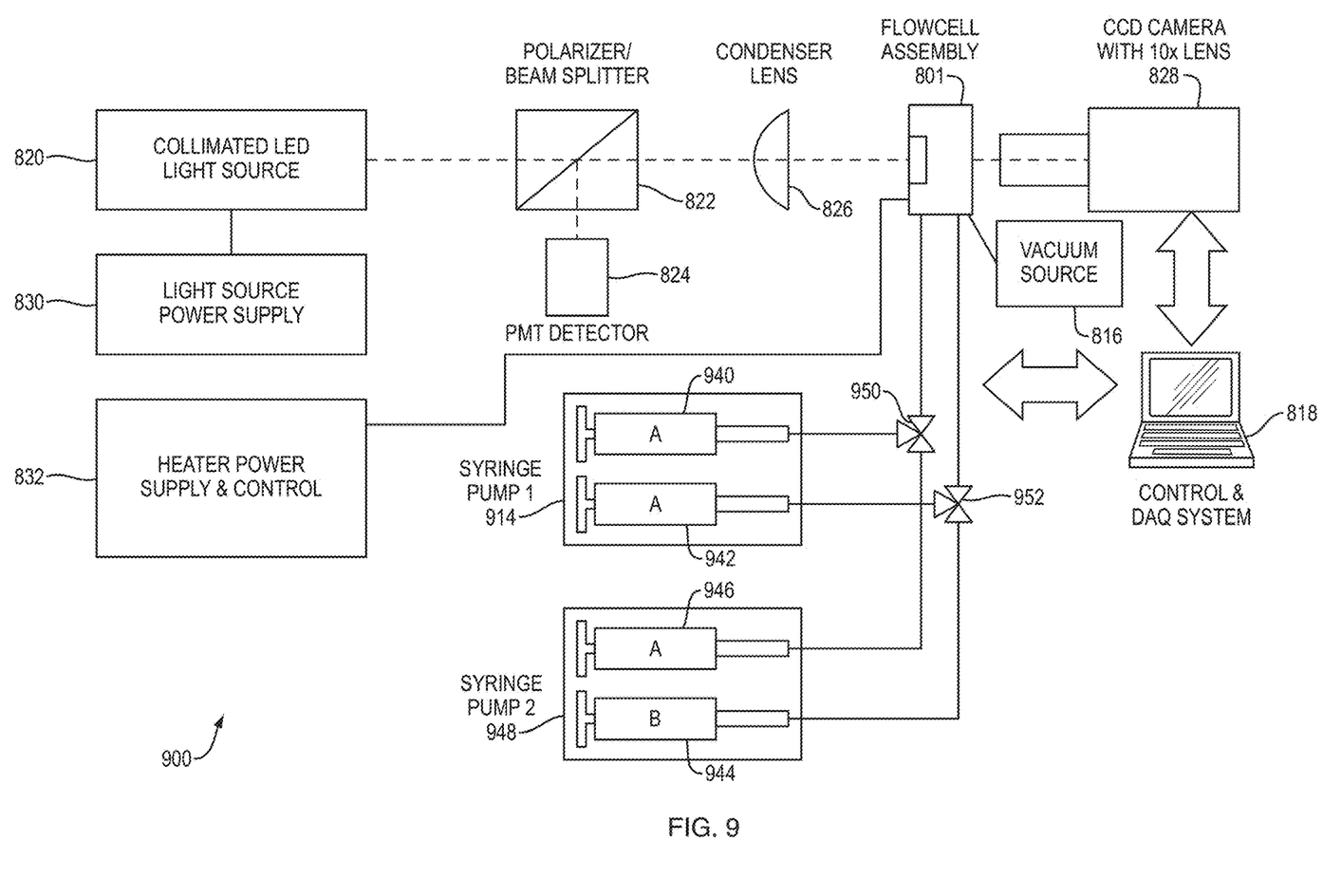
FIG. 9 is a schematic diagram of a system for calorimetry according to another example embodiment.
Figure 10A:
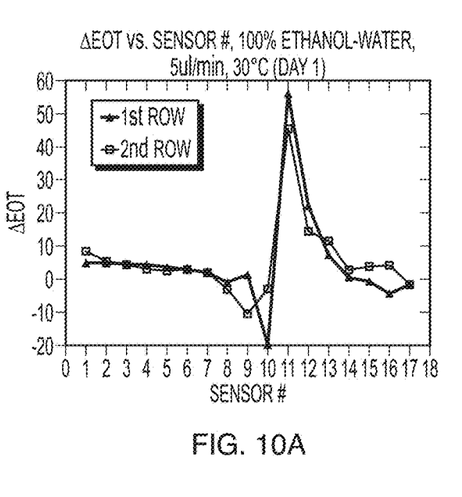
FIGS. 10A-10F are plots illustrating repeatability of results obtained using the stop-start method according to an example embodiment.
Figure 10B:
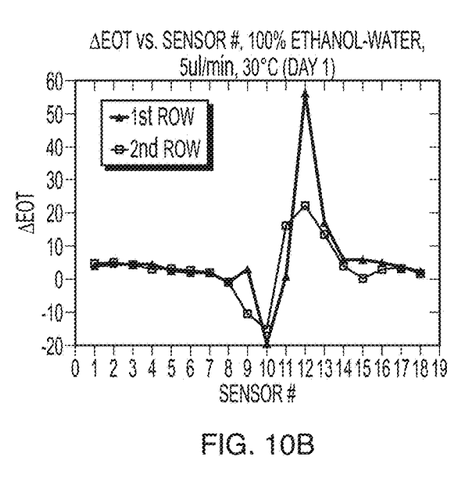
Figure 10C:
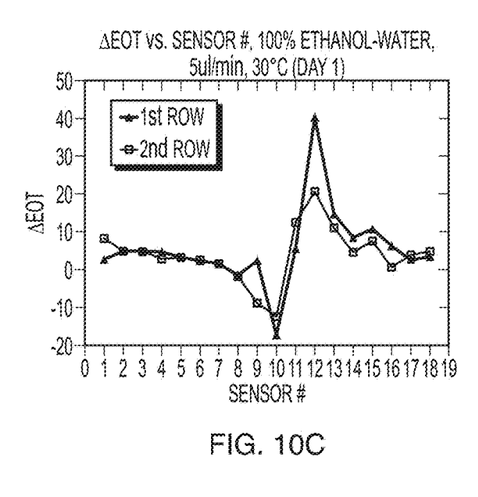
Figure 10D:
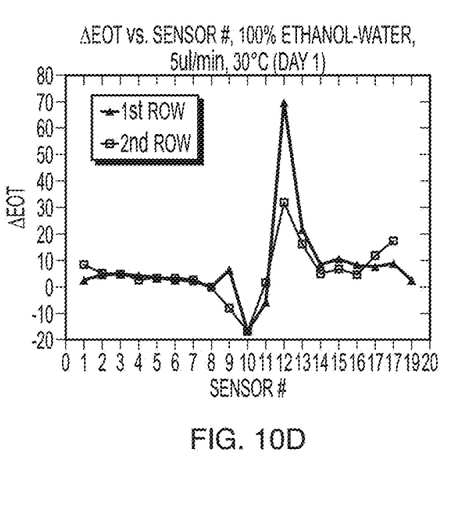
Figure 10E:
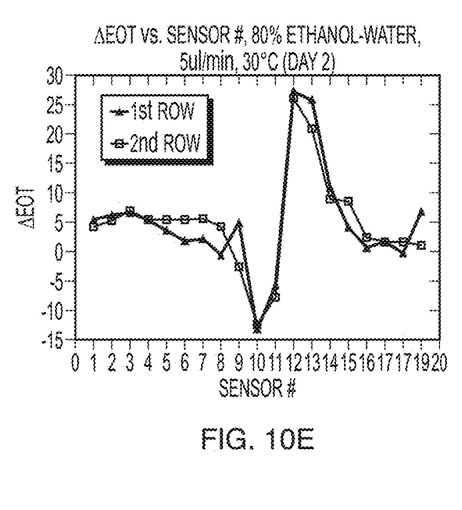
Figure 10F:
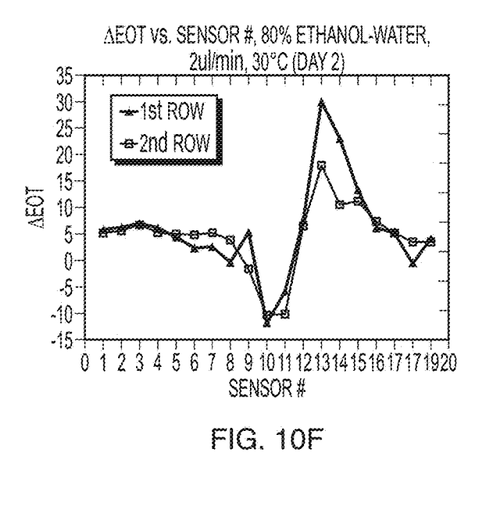

FIG. 9 is a schematic diagram of a system 900 for calorimetry according to another example embodiment. The system 900 is in many ways similar to the system 800 illustrated in FIG. 8. The same components have been identified using the same reference numerals as in FIG. 8. In contrast to system 800, system 900 includes two syringe pumps 914, 948 and four syringes 940, 942, 944, 946. The syringes are coupled to fluid lines that feed into the co-flow microchannel of the flowcell assembly 801. Valves 950, 952 are provided to switch between the syringes 940, 942, which are driven by a first pump 914, and syringes 944, 946, which are driven by a second pump 948. Switching of syringes and fluid flow is performed under the control of controller 818. As illustrated, syringe 940 is coupled via valve 950 to the first inlet of the microchannel of the flowcell assembly 801. Syringe 942 is coupled to the second inlet of the microchannel of flowcell assembly 801 via valve 952. During baseline EOT measurements, controller 818 causes syringe pump 914 to drive the first fluid (A) simultaneously from each of syringes 940 and 942 into the flowcell assembly 801. Fluid flow is then stopped and the co-flow microchannel and any connected fluid lines are emptied using vacuum source 816. Valves 950 and 952 are actuated to close fluid flow from syringes 940, 942 and to open fluid flow from syringes 944, 946. Actuation of the valves may occur prior to or after emptying of the channels, as appropriate. Once the channel(s) has been emptied, the controller 818 causes syringe pump 948 to drive fluid A from syringe 946 and fluid B from syringe 944 through the fluid lines and into the flowcell assembly 801. Using the same syringe pump 948 to drive both fluids (A and B) simultaneously facilitates achieving the same volumetric flow rates of fluids A and B into the co-flow reactor microchannel.

The valves may be actuated by actuators (e.g., solenoids) in response to control signals from the controller 818. Although valves 950, 952 are illustrated as three-way valves positioned at the T-junctions of fluid lines, alternative valve arrangements can be used. For example, each valve 950, 952 may be implemented as two separate valves, each of which being positioned in-line to close off fluid lines to the syringes. The separate valves can be positioned upstream from the T-junctions of the fluid lines. In general, the controller 818 can be programmed to orchestrate opening and closing of any valves of the system to achieve the desired fluid flow pattern.

As describe above, the stop-start process can be used to calculate an intensity difference between the Reaction compound and Pure compound. Repeatable data results are one of the useful features of this process, which is very valuable in microfluidics.

The Stop-Start method can be used with any reactant compounds. In the example data presented here, the method is used for examining thermodynamic properties of Water-Ethanol experiments. FIG. 3 shows the change in the EOT intensity in a micro flowcell with respect to the channel width using the Stop-Start method. The triangular shaped region is a result of a steady-state energy released during water-ethanol dilution.

Thermodynamic properties include enthalpy of reaction or enthalpy of dilution. These properties are related to the energy released during chemical or biological reactions. The energy released is determined by the heat transfer characteristics of the flowcell and the temperature and concentration changes of the reaction. For example, over a small volume of the flowcell:

$$E_{released} = \Delta H(n_{mixture}) = (\rho_{inj}\dot{V}_{inj}t + (mc_{ethanol} + mc_{water}))(T_{t_{inj}} - T_{t_0}) + \int_{t_0}^{t_{inj}} C_{\textit{eff}} \cdot (T(t) - T_{ET_i})dt \quad (1)$$

in which the $\rho_{inj}$ is the density of injected compound, $\dot{V}_{inj}$ is the volumetric flow rate, the mc parameters ($mc_{ethanol}$, $mc_{water}$) are the mass and specific heat of the components in the reaction zone. The $C_{\textit{eff}}$ is the effective thermal conductance that the energy released has with its environment at the $T_{ET_i}$, which is the Energy Transfer temperature.

The $\Delta H(n_{mixture})$ is the product of the number of moles consumed in the reaction times the enthalpy of dilution or enthalpy of reaction, depending on the type of reaction being investigated. Equation 1 relates this to the temperature changes which are determined from the observed ΔEOT and the calibration plots.

FIGS. 10A-10F are plots illustrating results obtained using the stop-start method according to an example embodiment. These figures demonstrate that the stop-start method provides repeatable results. Providing repeatable data is important in microfluidics experiments.

The six graphs in FIGS. 10A-10F show data obtained with the start stop method during water-ethanol dilution experiments. In the ΔEOT vs. sensor # plots, there are two series of data: $1^{st}$ row (filled triangles) and $2^{nd}$ row (open squares). The $1^{st}$ row corresponds to the first row of sensors on the NHA chip located in an upstream position of the microchannel (see row 211 in FIG. 2B) and the $2^{nd}$ row corresponds to the sensors located in a downstream position of the channel (see row 212 in FIG. 2B). Each row has 19 sensors along the channel width. In the example, the channel width is 500 µm and the two rows of sensors are positioned 1300 µm apart from each other. The same sensor chip with the two rows of sensors was used for all the experimental results illustrated in FIGS. 10A-10F.

In the experiment, two different concentrations of ethanol (100%, FIGS. 10A-10D, and 80%, FIGS. 10E-10F) are injected with deionized water (DI water) into the channel inlets using a syringe pump. The measured EOT at sensor 10 is likely an artifact due to a result of a shadow caused by the change in the index of refraction between the water and ethanol interface. As can be observed in the plots, the ΔEOT with respect to sensor number show a similar trend, the triangular region, for different experiments and for the two rows of sensors.

The day of the experiments were conducted is also provided in the plots and show the similarity of the results conducted in one day. The results shown in FIG. 10A-10D are similar and stem from experiments conducted on the same day ("Day 1"). Similarly, the results shown in FIGS. 10E-10F were obtained on the same day ("Day 2").

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A method for calorimetry, the method comprising:
   a) flowing a first fluid through a co-flow reactor microchannel having plural inlets and an outlet, the first fluid flowing through each of the inlets;
   b) while flowing the first fluid, measuring transmission of light through a Nano Hole Array (NHA) sensor coupled to the co-flow reactor micro channel, to obtain a baseline extraordinary optical transmission (EOT) measurement;
   c) stopping the flow of the first fluid;
   d) emptying the co-flow reactor microchannel of the first fluid after stopping the flow of the first fluid;
   e) flowing the first fluid and a second fluid through the co-flow reactor microchannel such that a reaction occurs at least at a diffusion interface of the fluids, the first fluid flowing through a first of the inlets and the second fluid flowing through a second of the inlets;
   f) while flowing the first and second fluids, measuring transmission of light through the NHA sensor to obtain a reaction EOT measurement; and
   g) calculating a calorimetry measurement as a function of the baseline EOT measurement and the reaction EOT measurement, the calorimetry measurement being indicative of energy released during the reaction, wherein calculating the calorimetric measurement includes averaging the EOT measurements over a period of time to obtain an averaged baseline EOT value and an averaged reaction EOT value.

2. The method of claim 1, wherein flowing the first and seconds fluids includes using a syringe pump to drive the first fluid from a first syringe coupled to the first of the inlets and drive the second fluid from a second syringe coupled the second of the inlets.

3. The method of claim 1, wherein emptying the co-flow reactor microchannel includes applying a vacuum source to the microchannel.

4. The method of claim 1, wherein measuring transmission of light includes irradiating the NHA sensor and fluid flowing through the co-flow reactor microchannel with incident light.

5. The method of claim 1, wherein the NHA sensor includes an array of holes in an electrically conducting layer, the layer being proximate to and in thermal contact with the co-flow reactor microchannel.

6. The method of claim 1, wherein stopping the flow of the first fluid and emptying the co-flow reactor microchannel reduces formation of bubbles when flowing the first and second fluids through the co-flow reactor microchannel.

7. The method of claim 1, wherein calculating the calorimetric measurement includes calculating an EOT difference by subtracting the averaged reaction EOT value from the averaged baseline EOT value.

8. The method of claim 7, wherein the EOT difference is calculated for multiple NHA sensors that are equally spaced apart.

9. The method of claim 8, wherein the NHA sensors are arranged in parallel rows that are transverse to a direction of flow through the co-flow reactor microchannel.

10. The method of claim 1, wherein the first and second fluids comprise dielectric materials.

11. The method of claim 10, wherein the second fluid includes a carrier fluid and a reactant.

12. The method of claim 11, wherein the first fluid includes a carrier fluid and a reactant that is different from the reactant of the second fluid.

13. The method of claim 12, wherein the carrier fluids of the first and second fluids are the same.

14. A system for calorimetry, the system comprising:
   a) a co-flow reactor microchannel having plural inlets and an outlet;
   b) multiple Nano Hole Array (NHA) sensors equally spaced apart and coupled to the co-flow reactor microchannel;
   c) a pump to drive fluid through the co-flow reactor microchannel;
   d) a vacuum source coupled to the microchannel; and
   e) a controller coupled to the pump and the NHA sensors, the controller programmed to:
      i) control the pump to flow a first fluid through a co-flow reactor microchannel, the first fluid flowing through each of the inlets;
      ii) while flowing the first fluid, measure transmission of light through the NHA sensors to obtain a baseline extraordinary optical transmission (EOT) measurement;
      iii) control the pump to stop the flow of the first fluid;
      iv) control the vacuum source to empty the co-flow reactor microchannel of the first fluid after stopping the flow of the first fluid;
      v) control the pump to flow the first fluid and a second fluid through the co-flow reactor microchannel such that a reaction occurs at least at a diffusion interface of the fluids, the first fluid flowing through a first of the inlets and the second fluid flowing through a second of the inlets;

vi) while flowing the first and second fluids, measure transmission of light through the NHA sensors to obtain a reaction EOT measurement; and vii) calculate a calorimetry measurement as a function of the baseline EOT measurement and the reaction EOT measurement, the calorimetry measurement being indicative of energy released during the reaction, the calorimetric measurement including an EOT difference calculated for the NHA sensors.

15. The system of claim 14, wherein the pump is a syringe pump configured to drive the first fluid from a first syringe coupled to the first of the inlets and, when flowing the first and second fluids, drive the second fluid from a second syringe coupled the second of the inlets.

16. The system of claim 14, further including a light source configured to irradiate the NHA sensor and fluid flowing through the co-flow reactor microchannel, wherein the controller is programmed to control the light source to irradiate the NHA sensor and fluid flowing through the co-flow reactor microchannel with incident light to measure the transmission of light.

17. The system of claim 14, wherein the NHA sensor includes an array of holes in an electrically conducting layer, the layer being proximate to and in thermal contact with the co-flow reactor microchannel.

18. The system of claim 14, wherein the NHA sensors are arranged in parallel rows that are transverse to a direction of flow through the co-flow reactor microchannel.

\* \* \* \* \*